T. R. TIMBY.
ATTACHMENT TO COOKING-STOVES.
No. 173,691. Patented Feb. 15, 1876.
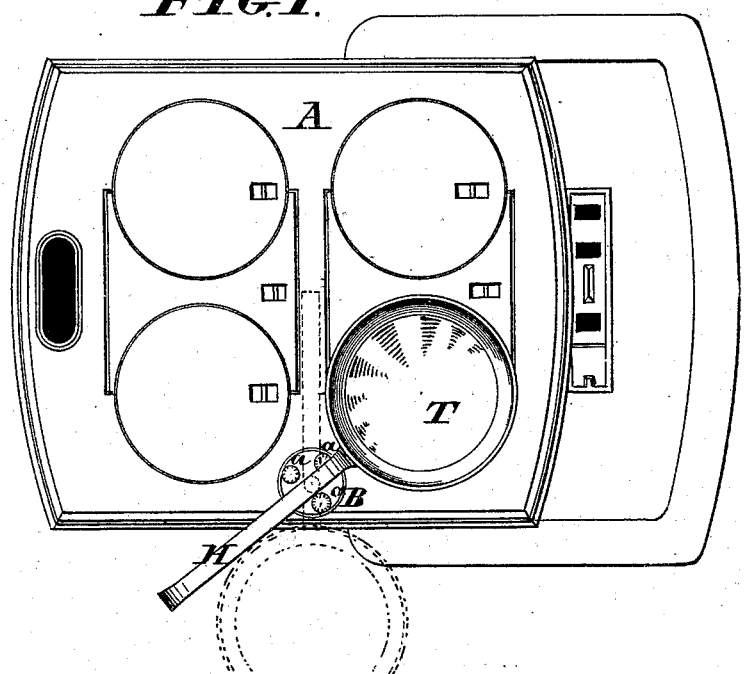
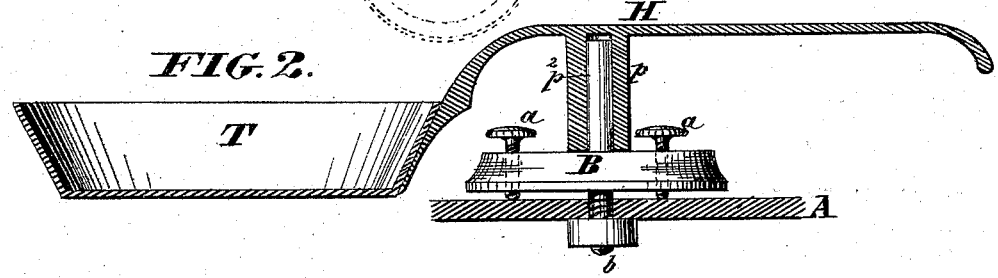
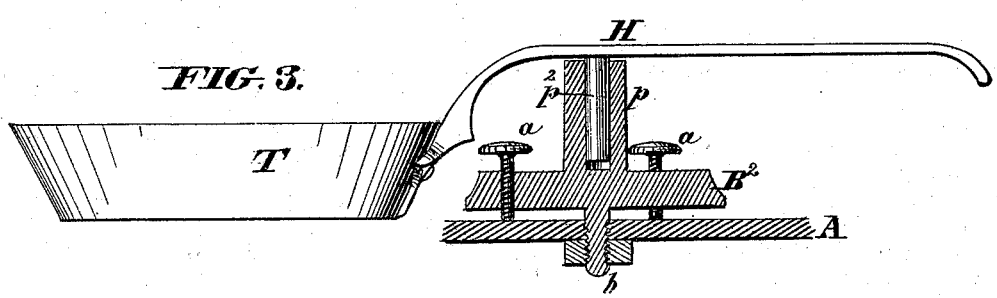
WITNESSES
Chas. Gooch
Le Blond. Burdett.
INVENTOR
Theodore R. Timby
By Knight Bros Attorneys

UNITED STATES PATENT OFFICE

THEODORE R. TIMBY, OF TARRYTOWN, NEW YORK.

IMPROVEMENT IN ATTACHMENTS TO COOKING-STOVES.

Specification forming part of Letters Patent No. 173,691, dated February 15, 1876; application filed January 31, 1876.

*To all whom it may concern:*

Be it known that I, THEODORE R. TIMBY, of Tarrytown, in the county of Westchester and State of New York, have invented a new and useful Improvement in Attachments for Cooking Stoves and Ranges, of which the following is a specification:

This invention relates to my attachment for cooking stoves and ranges which is the subject-matter of United States Letters Patent No. 168,809, dated October 11, 1875. The said attachment serves to facilitate moving griddles or other cooking utensils from place to place on the stove, as to hotter or cooler positions, and to support the same over or off the stove or range.

The present invention consists in providing the handle of the utensil with a downwardly-projecting pivot or pivotal socket formed on or fixedly attached thereto, a counterpart being attached to the top plate of the stove or range. A simple pivotal support for the utensil is thus formed, and the latter is adapted to be readily lifted free of the part which is attached to the stove or range, and as readily replaced at will.

Figure 1 is a plan view of a cooking-stove provided with an attachment illustrating this invention. Fig. 2 is a sectional elevation of the attachment on a larger scale. Fig. 3 is a similar view illustrating a modification.

Like letters of reference indicate corresponding parts in the several figures.

The utensil T, to which this invention is applied, is, preferably, a circular pan of swaged sheet metal, adapted to fit over pot-holes, and to be used for a variety of purposes. A handle, H, for the utensil is made of convenient shape, and provided with a pivotal socket, $p$, Fig. 2, or a pivot, $p^2$, Fig. 3, projecting downward and formed on or fixedly attached to the handle at a point between its ends, preferably near the pan.

To attach a pivotal counterpart to the stove or range, so as to render it secure, and, at the same time, to provide for adjusting the attachment, so that the pan shall swing horizontally on a level with the top of the stove or range, and slide on the top plate, a base, B or $B^2$, of peculiar construction, has been provided. This base part carries a vertical pivot, $p^2$, Fig. 2, or a pivotal socket, $p$, Fig. 3, according to the nature of the projection on the handle, and it has a central attaching-bolt, $b$, and three or more adjusting-screws, $a$. The bolt $b$ is adapted to pass through the top plate A of the stove or range, and receive a nut beneath it, as illustrated, and the adjusting-screws $b$ engage with the upper surface of the top plate at different points around the central bolt. This peculiar method of attaching the counterpart of the vertical pivot or pivotal socket to the top plate is preferred, but is not considered essential to the present invention.

I claim as new—

The handle H, provided with a downwardly-projecting pivot or pivotal socket, $p$, formed on or fixedly attached thereto, in combination with a vertical counterpart, $p^2$, attached to the top plate of the stove or range, substantially as herein shown and described, for the purpose set forth.

THEODORE R. TIMBY.

Witnesses:
- ABNER C. THOMAS,
  JAS. L. EWIN.